(12) United States Patent
Dettinger et al.

(10) Patent No.: US 9,104,967 B2
(45) Date of Patent: Aug. 11, 2015

(54) APPLYING RULESET LIMITING CRITERIA FOR AFFIRMING RULE INPUTS AND OUTPUTS

(75) Inventors: Richard Dean Dettinger, Rochester, MN (US); Frederick Allyn Kulack, Rochester, MN (US); Shannon Everett Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 1919 days.

(21) Appl. No.: 11/941,190

(22) Filed: Nov. 16, 2007

(65) Prior Publication Data

US 2009/0132456 A1  May 21, 2009

(51) Int. Cl.
  *G06N 5/00*  (2006.01)
  *G06F 1/00*  (2006.01)
  *G06N 5/02*  (2006.01)

(52) U.S. Cl.
  CPC ...................... *G06N 5/025* (2013.01)

(58) Field of Classification Search
  CPC ........... G06N 5/02; G06N 5/025; G06N 5/04; G06N 5/22; G06Q 10/00
  USPC .......................................... 704/9; 705/2, 7, 42
  See application file for complete search history.

(56) References Cited

U.S. PATENT DOCUMENTS

| | | | |
|---|---|---|---|
| 2003/0139957 A1* | 7/2003 | Satchwell ......................... | 705/7 |
| 2003/0191667 A1* | 10/2003 | Fitzgerald et al. ................ | 705/2 |
| 2004/0073511 A1* | 4/2004 | Beaumont et al. .............. | 705/42 |

* cited by examiner

*Primary Examiner* — Jeffrey A Gaffin
*Assistant Examiner* — Kalpana Bharadwaj
(74) *Attorney, Agent, or Firm* — Patterson & Sheridan, LLP

(57) ABSTRACT

Embodiments of the invention provide techniques for processing abstract rules with limiting criteria. In one embodiment, limiting criteria may specify requirements for characteristics of sets of input or output values of processing abstract rules. For example, limiting criteria may specify requirements for statistical validity of a set of input values, such as a minimum record count. In one aspect, limiting criteria may include input criteria applied to input data prior to being processed in a rule engine. In another aspect, limiting criteria may include output criteria applied to an output of a rule engine. In the event that limiting criteria are not satisfied, the processing of the abstract rule may be terminated.

24 Claims, 6 Drawing Sheets

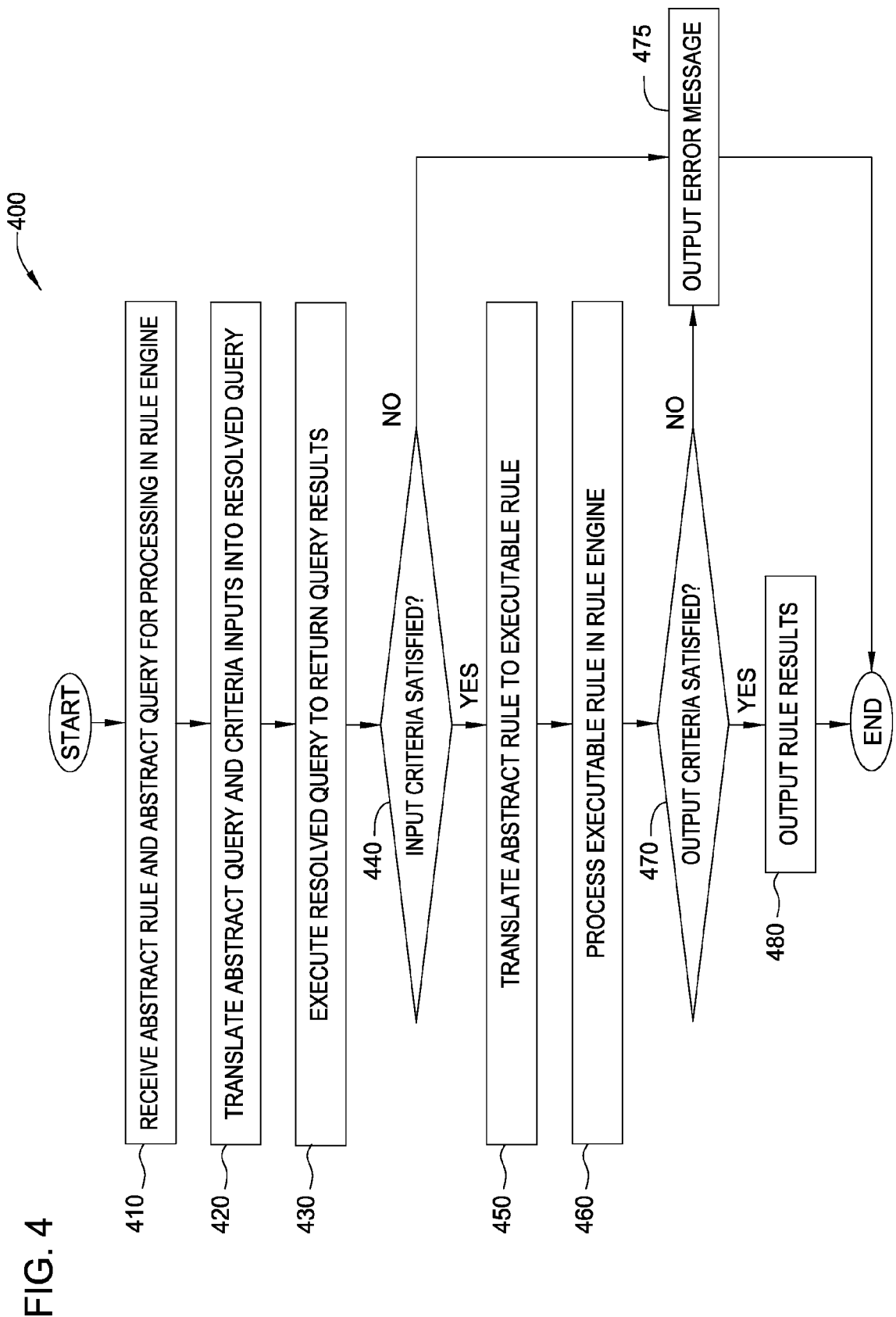

APPLYING RULESET LIMITING CRITERIA FOR AFFIRMING RULE INPUTS AND OUTPUTS

BACKGROUND OF THE INVENTION

1. Field of the Invention

The invention generally relates to computer database systems. More particularly, the invention relates to techniques for validating abstract rule inputs and outputs.

2. Description of the Related Art

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (DBMS). Queries of a relational database may specify which data items should be retrieved, how to join various data items, and conditions (predicates) that must be satisfied for a particular data item to be included in a query result table.

The complexity of constructing a query statement, however, generally makes it difficult for average users to compose queries of a relational database. Because of this complexity, users often turn to database query applications to assist them in composing queries of a database. One technique for managing the complexity of a relational database, and the SQL query language, is to use a database abstraction model. Generally, a database abstraction model is constructed from logical fields that map to data stored in the underlying physical database. Data abstraction models may be used to implement abstract rules. Abstract rules specify predicates and actions, and are composed with reference to logical fields. Abstract rules may be executed in a rule engine in order to perform an analysis routine.

SUMMARY OF THE INVENTION

One embodiment of the invention includes a computer-implemented method for processing an abstract rule. The method may generally include receiving an abstract rule having (i) a conditional statement and (ii) a consequential statement defining a particular result returned by the abstract rule for a given set of input data supplied to the rule based on an evaluation of the conditional statement and the given set of input data. The method may further include receiving a set of query results comprising a plurality of data records, each including a set of input data to be supplied to the abstract rule, and determining whether the sets of input data included in the plurality of data records satisfy input criteria associated with the abstract rule. The input criteria may specify one or more requirements for input data supplied to the abstract rule. If the input criteria associated with the abstract rule are satisfied, a rule engine configured to process the abstract rule may be executed against each of the sets of input data, and an output of the abstract rule may be set as the result returned by the abstract rule for each of the sets of input data. The method may also include storing the output of the abstract rule.

Another embodiment of the invention includes a computer-readable storage medium containing a program for processing an abstract rule. When executed, the program may perform an operation that generally includes receiving an abstract rule having (i) a conditional statement and (ii) a consequential statement defining a particular result returned by the abstract rule for a given set of input data supplied to the rule based on an evaluation of the conditional statement and the given set of input data. The operation may further include receiving a set of query results comprising a plurality of data records, each including a set of input data to be supplied to the abstract rule, and determining whether the sets of input data included in the plurality of data records satisfy input criteria associated with the abstract rule. The input criteria may specify one or more requirements for input data supplied to the abstract rule. If the input criteria associated with the abstract rule are satisfied, a rule engine configured to process the abstract rule may be executed against each of the sets of input data, and an output of the abstract rule may be set as the result returned by the abstract rule for each of the sets of input data. The operation may also include storing the output of the abstract rule.

Still another embodiment of the invention includes a system having a processor and a memory containing a program. When executed on the processor, the program is configured to process an abstract rule. The program may be generally configured to receive an abstract rule having (i) a conditional statement and (ii) a consequential statement defining a particular result returned by the abstract rule for a given set of input data supplied to the rule based on an evaluation of the conditional statement and the given set of input data. The program may be further configured to receive a set of query results comprising a plurality of data records, each including a set of input data to be supplied to the abstract rule, and to determine whether the sets of input data included in the plurality of data records satisfy input criteria associated with the abstract rule. The input criteria may specify one or more requirements for input data supplied to the abstract rule. If the input criteria associated with the abstract rule are satisfied, a rule engine configured to process the abstract rule may be executed against each of the sets of input data, and an output of the abstract rule may be set as the result returned by the abstract rule for each of the sets of input data. The program may further be configured to store the output of the abstract rule.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 is a flow diagram illustrating a method 400 for processing an abstract rule, according to one embodiment of the invention.

DETAILED DESCRIPTION OF THE PREFERRED EMBODIMENTS

Figure 1:
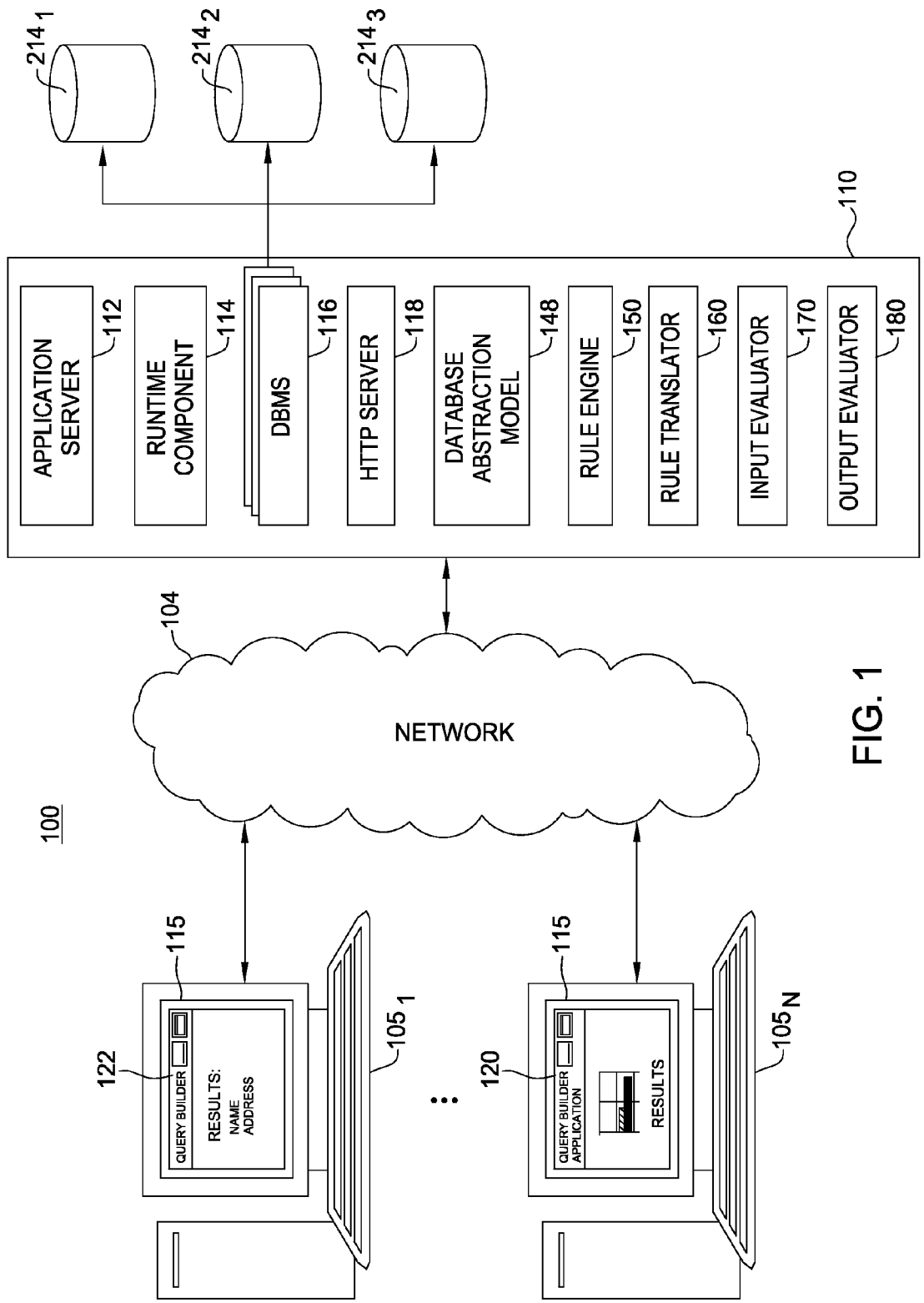
FIG. 1 illustrates a network environment using a client-server configuration, according to one embodiment of the invention.

Generally, a database abstraction model is constructed from logical fields that map to data stored in the underlying physical database. Each logical field defines an access method that specifies a location (e.g., a table and column) in the underlying database from which to retrieve data for a given logical field. Users compose an abstract query by selecting logical fields and specifying conditions. Data is retrieved from the physical database by generating a resolved query (e.g., an SQL statement) from the abstract query. Because the database abstraction model is not tied to the syntax or semantics of the physical database or query language, additional capabilities may be provided by the database abstraction model without having to modify the underlying database.

Inference rules may be used to evaluate data in a database. A set of rules may implement an analysis routine used to detect (or infer) states or conditions about data (or the objects or entities represented by data, e.g., patients), and a rule engine can evaluate predicates and execute actions defined in the rules. Where rule actions are used to provide recommendations for users, for example, treatment recommendations for doctors in medical institutions, the rules may be defined such that corresponding predicates reflect expert-based knowledge of possible diagnoses and evaluations of patient conditions. Thus, in such a case, rules may be implemented to assist doctors by making diagnosis recommendations, drug recommendations, providing reminders of required verifications and checks, etc.

However, composing inference rules is frequently a complex and difficult process which requires detailed knowledge of a given database as well as the requisite expert knowledge for rule semantics. More specifically, for each predicate, and for each action of the given rule that the user wants to create, the user may require an understanding of the database schema in order to identify the correct tables and columns, and relationships between tables and columns in the underlying database table(s). One technique for managing the creation of rules is to use abstract rule sets. Abstract rules specify predicates and actions composed using to logical fields of a database abstraction model. Because the logical fields provide a user with a logical view of data, the user may compose rules based on their conceptual understating of the data, without the need to also understand the physical layout of the underlying database or query language grammar.

Analysis routines can be defined by abstract rule sets including one or more abstract rules, each having one or more predicates and actions. Commonly, abstract rules may be composed using the following structure:

IF [predicate] THEN [perform specified action]

A rule predicate specifies a conditional statement evaluated in a rule engine. As stated, the predicate may be composed from the logical fields of a data abstraction model. Further, prior to being evaluated by the rule engine, the predicate may be transformed into a form executable by the rule engine. For example, the rule engine may transform the predicate into an SQL query used to identify database records that satisfy the condition specified in the predicate, e.g., a set of patient identifiers. For database records that satisfy the predicate (i.e., meet the condition), the rule engine may execute the rule action specified by the rule.

Embodiments of the invention provide techniques for processing abstract rules with limiting criteria. In one embodiment, limiting criteria may specify requirements for characteristics of sets of input or output values of processing abstract rules. For example, limiting criteria may specify requirements for statistical validity of a set of input values, such as a minimum record count. In one aspect, limiting criteria may include input criteria applied to input data prior to being processed in a rule engine. In another aspect, limiting criteria may include output criteria applied to an output of a rule engine. In the event that limiting criteria are not satisfied, the processing of the abstract rule may be terminated, relative to a given collection of input data records.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates a network environment 100 using a client-server configuration, according to one embodiment of the invention. Client computer systems $105_{1-N}$ include an interface that enables network communications with other systems over network 104. The network 104 may be a local area network where both the client system 105 and server system 110 reside in the same general location, or may be network connections between geographically distributed systems, including network connections over the Internet. Client system 105 generally includes a central processing unit (CPU) connected by a bus to memory and storage (not shown). Each client system 105 is typically running an operating system configured to manage interaction between the computer hardware and the higher-level software applications running on the client system 105 (e.g., a Linux® distribution, a version of the Microsoft Windows® operating system IBM's AIX® or OS/400®, FreeBSD, and the like). ("Linux" is a registered trademark of Linus Torvalds in the United States and other countries.)

The server system 110 may include hardware components similar to those used by the client system 105. Accordingly, the server system 110 generally includes a CPU, a memory, and a storage device, coupled by a bus (not shown). The server system 110 is also running an operating system, (e.g., a Linux® distribution, Microsoft Windows®, IBM's OS/400® or AIX®, FreeBSD, and the like).

The network environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, users interact with the server system 110 using a graphical user interface (GUI) provided by a user interface 115. In a particular embodiment, GUI content may comprise HTML documents (i.e., web-pages) rendered on a client computer system $105_1$ using web-browser 122. In such an embodiment, the server system 110 includes a Hypertext Transfer Protocol (HTTP) server 118 (e.g., a web server such as the open source Apache web-server program or IBM's Web Sphere® program) configured to respond to HTTP requests from the client system 105 and to transmit HTML documents to client system 105. The web-pages themselves may be static documents stored on server system 110 or generated dynamically using an application server 112 interacting with HTTP server 118 to service HTTP requests. In another embodiment, client application 120 may comprise a database front-end, or query application program running on client system $105_N$. The web-browser 122 and application 120 may be configured to allow a user to compose an abstract query, and to submit the query to the runtime component 114 for processing.

As illustrated in FIG. 1, server system 110 may further include a runtime component 114, a database management system (DBMS) 116, a database abstraction model (DAM) 148, a rule engine 150, a rule translator 160, An input evaluator 170 and a output evaluator 180. In one embodiment, these components may be provided using software applications executing on the server system 110. The DBMS 116 includes a software application configured to manage databases $214_{1-3}$. That is, the DBMS 116 communicates with the underlying physical database system, and manages the physical database environment behind the database abstraction model 148. Users interact with the user interface 115 to compose and submit an abstract query to the runtime component 114 for processing.

In one embodiment, the runtime component 114 may be configured to receive an abstract query, and in response, to generate a "resolved" or "concrete" query that corresponds to the schema of underlying physical databases 214. For example, the runtime component 114 may be configured to generate one or more Structured Query Language (SQL) queries from an abstract query. The resolved queries generated by the runtime component 114 are supplied to DBMS 116 for execution. Additionally, the runtime component 114 may be configured to modify the resolved query with additional restrictions or conditions. For example, runtime component 114 may be configured to modify the resolved query to retrieve additional data based on limiting criteria specified in DAM 148. Such additional data may include fields of DAM 148, predefined database queries, physical database fields, a call to an external data source (e.g., a call to a web service), and the like.

In one embodiment, the rule engine 150 represents one or more rule engines (i.e., inference engines) configured to carry out analysis routines for various purposes, including know-how management, decision making and statistical analysis. More specifically, the rule engine 150 can carry out analysis routines by processing rule sets including one or more rules, with each rule having predicates and actions. The rule engine 150 may be a software application installed on server 110. Alternatively, the rule engine 150 may be provided as "software as a service" (SAAS), wherein functions on a remote hosted system are accessed over a network as required. Rule engine 150 may be licensed on a "per use" basis, meaning each use of a function included in rule engine 150 is charged as a separate cost. Further, rule engine 150 may be licensed so that costs are based on the number of users or number of processors accessing the rule engine 150.

As described, abstract rules are composed by referencing logical fields of DAM 148, and thus do not require a user to understand the schema of the physical database 214. Rule translator 160 represents a software application configured to translate abstract rules to executable rules, which are formatted in the data format required by the rule engine 150. The executable rules may also be resolved to the database 214. Rule translator 160 may be further configured to optimize the execution of rule engine 150 by combining multiple abstract rules into one executable rule.

In one embodiment, a user may specify limiting criteria for the use of rule engine 150. Limiting criteria may include input criteria for validating the set of input values processed in rule engine 150 as a whole. That is, rather than evaluating each record of input data separately, input criteria may be evaluated based on group properties of the entire set of input records. Further, limiting criteria may include output criteria for evaluating the set of output results from rule engine 150. Such limiting criteria may be used, for example, to ensure statistical validity of the input or output data.

In one embodiment, input evaluator 170 represents a software application configured to evaluate input data to rule engine 150 to determine whether input criteria are satisfied, and output evaluator 180 represents a software application configured to evaluate the output of rule engine 150 to determine whether output criteria are satisfied. The software components of server system 110 are further described below with reference to FIGS. 2 and 3A-3C.

Figure 2:
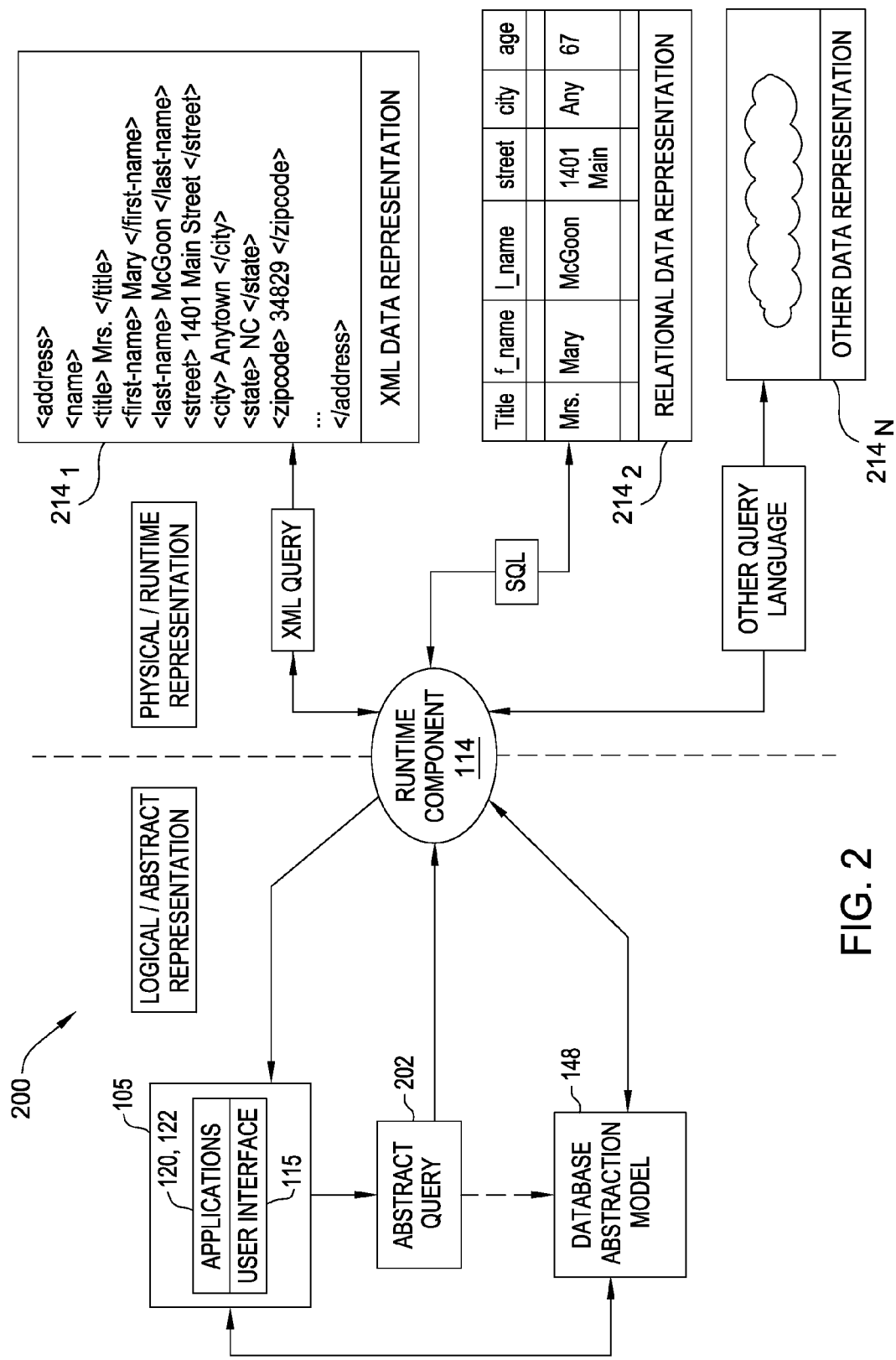
FIG. 2 is a diagram illustrating a database abstraction model constructed over an underlying physical database, according to one embodiment of the invention.

FIG. 2 illustrates a plurality of interrelated components of a database abstraction model, along with relationships between the logical view of data provided by the abstraction model environment (the left side of FIG. 2), and the underlying physical database mechanisms used to store the data (the right side of FIG. 2).

In one embodiment, users may compose an abstract query 202 using the user interface 115 provided by applications 120, 122. An abstract query 202 is generally referred to as "abstract" because it is composed using logical fields 208 rather than direct references to data structures in the underlying physical databases 214. The logical fields include specifications of access methods for mapping to a physical view of the data, including various underlying storage mechanisms. For example, for a given logical field 208, the runtime component may be generate an XML query that queries data from database $214_1$, an SQL query of relational database $214_2$, or other query composed according to another physical storage mechanism using "other" data representation $214_3$, or combinations thereof (whether currently known or later developed).

In one embodiment, the results of abstract query 202 may be used as inputs for executing an abstract rule. That is, a rule engine (e.g., rule engine 150 illustrated in FIG. 1) may be configured to process abstract rules by using the results of an abstract query 202 as rule inputs. For example, consider a DAM configured for data records of a hospital. An abstract query performed in the hospital DAM may retrieve patient data records for use as inputs to abstract rule sets. Assume that the abstract rule sets are configured to identify patients receiving improper or insufficient treatment (e.g., patients receiving medication that is incompatible with their genetic make-up). Thus, in this example, processing the abstract rule sets with patient data is performed as an analysis routine to alert medical personnel of potentially dangerous or critical situations. Such analysis routines may be scheduled to be run periodically (e.g., daily, weekly, etc.), in order to analyze new or updated data.

Figure 3A:
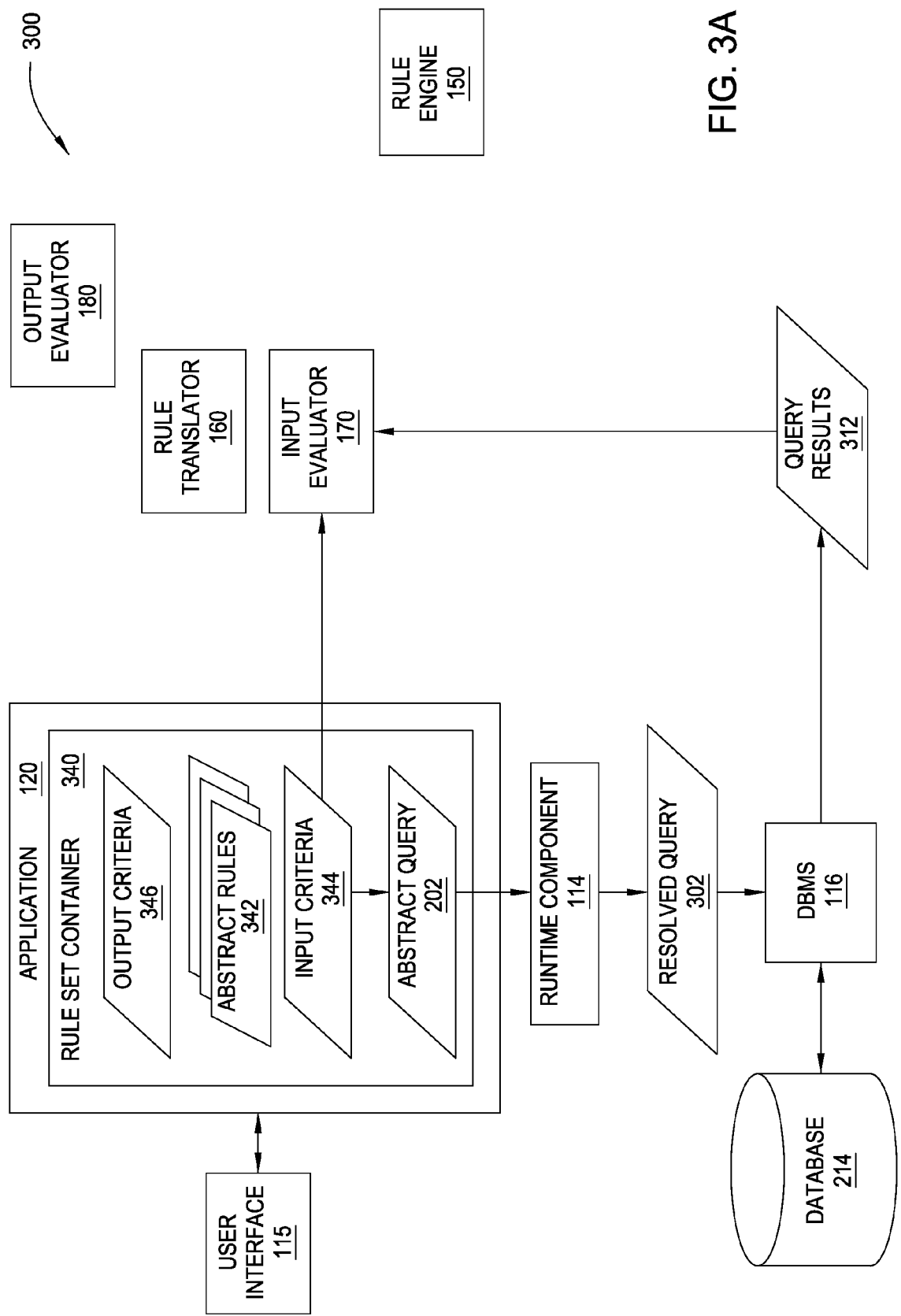
FIGS. 3A-3C illustrate a relational view 300 of software components for processing abstract rules, according to one embodiment of the invention.
Figure 3B:
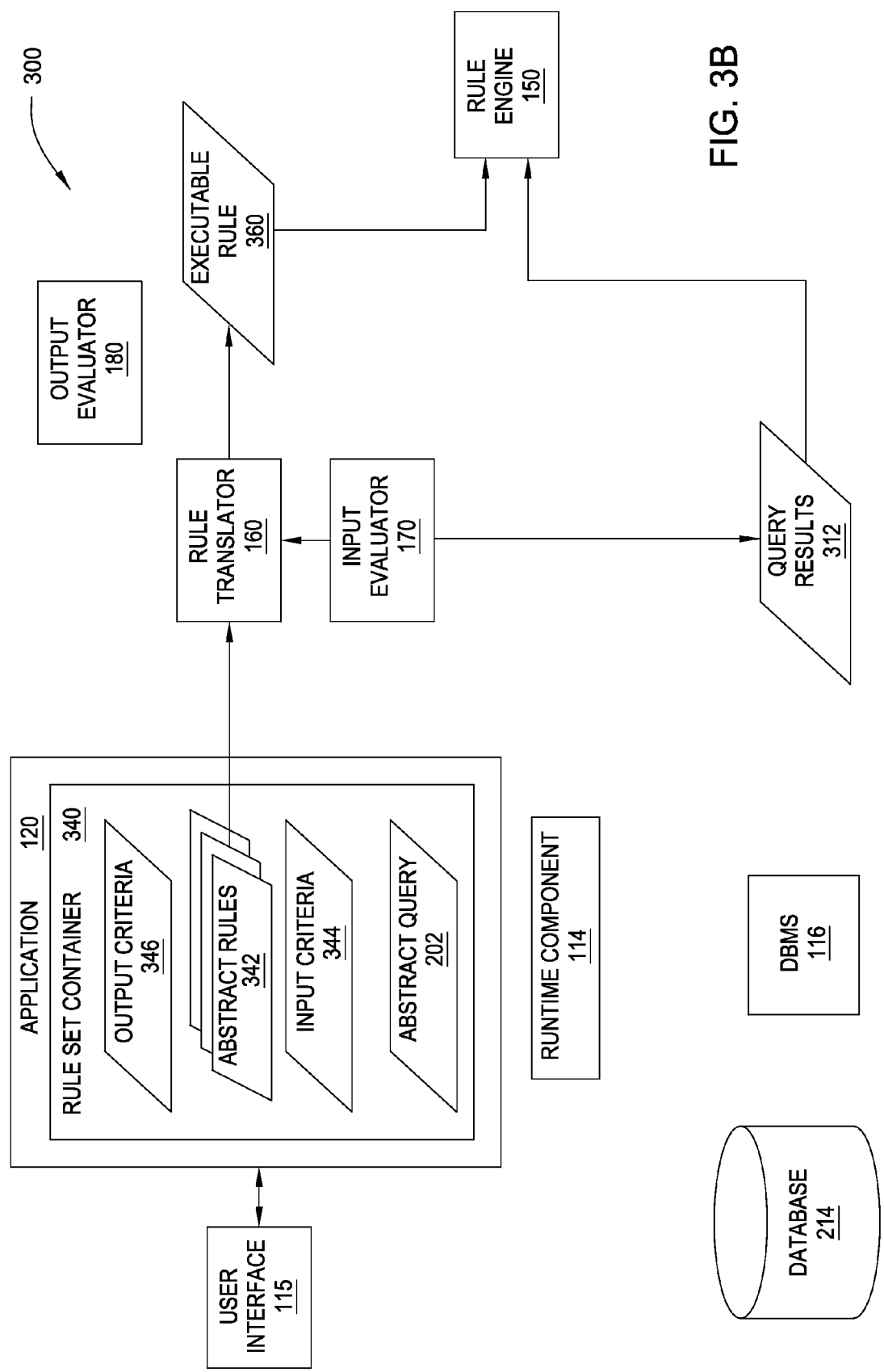
Figure 3C:
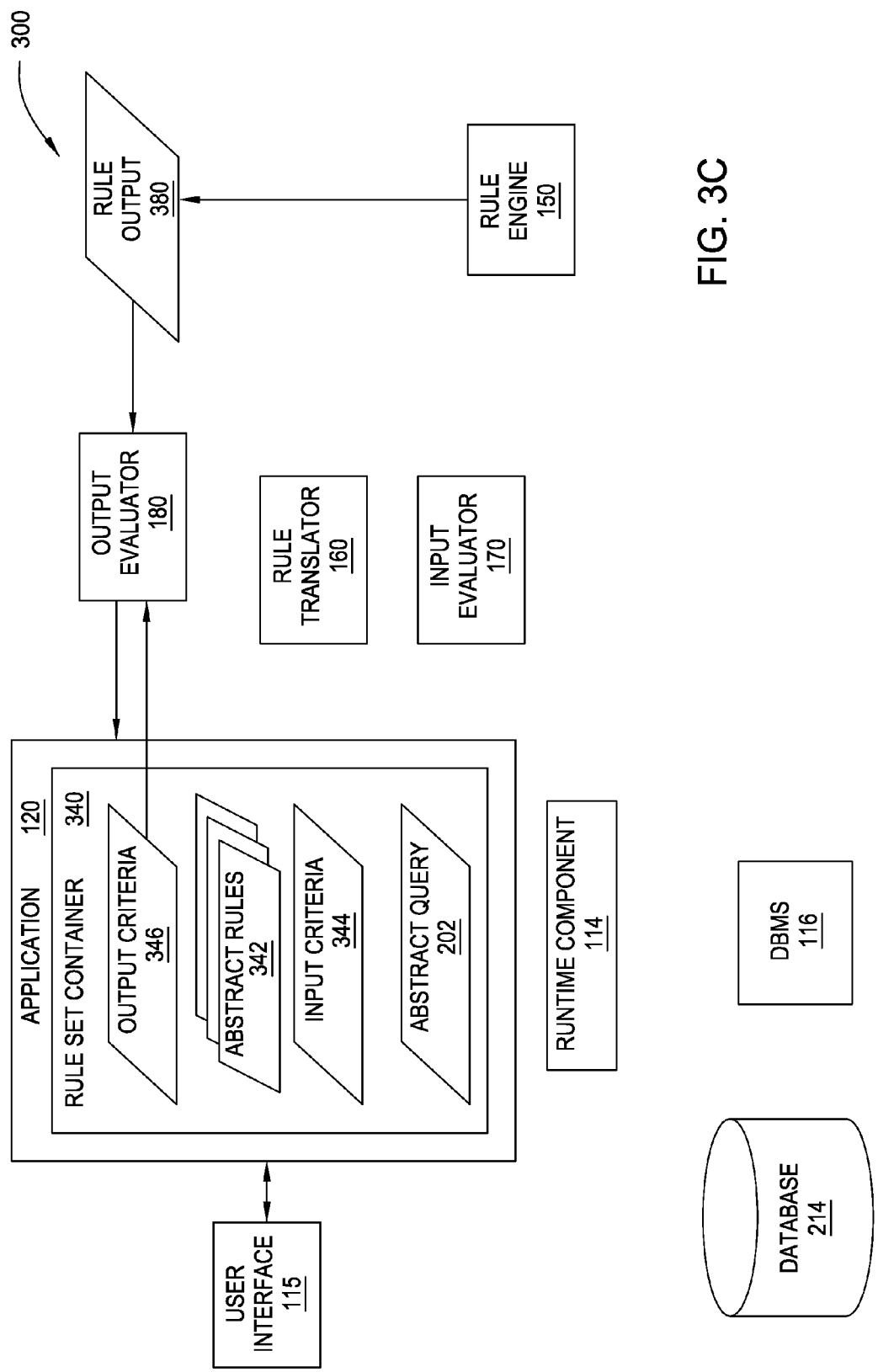

FIGS. 3A-3C illustrate a relational view 300 of software components for processing abstract rules, according to one embodiment of the invention. FIG. 3A illustrates a first (i.e., initial) stage in processing an abstract rule 342 in an abstract rule set container 340. As shown, the software components of relational view 300 include an application 120, a runtime component 114, a database management system (DBMS) 116, a database 214, a rule engine 150, a rule translator 160, an input evaluator 170 and an output evaluator 180.

Application 120 may include a rule set container 340 configured to include multiple abstract rules 342. In one embodiment, each abstract rule 342 (or a set of abstract rules 342) may be directed to a particular area of expertise, and may be composed and maintained by a subject matter expert. For example, consider a rule set container 340 used for performing medical diagnosis routines. The rule set container 340 may include a first abstract rule 342 that requires an input of a result for a particular genetic test retrieved from database 214 by DBMS 116. The rule set container 340 may also include a second abstract rule 342 that excludes any test results that are more than one year old. In this example, assume that the first abstract rule 342 is maintained by a geneticist, and the second abstract rule 342 is maintained by a data quality analyst.

In one embodiment, rule set container 340 is a data structure configured to enable the processing of multiple abstract rule sets 342 in combination. More specifically, rule container 340 may enable multiple abstract rule sets 342, directed to various areas of expertise, to be processed together with a single set of data inputs, while allowing each abstract rule set 342 to be maintained separately by different rule set owners (i.e., subject matter experts). In one embodiment, rule set container 340 may contain multiple abstract rule sets 342. Alternatively, rule set container 340 may store pointers to external abstract rule sets 342 (possibly stored in their own rule set containers 340). Thus, in this embodiment, one abstract rule set 342 may be associated to multiple rule set containers 340.

As shown in FIG. 3A, rule set container 340 also includes an abstract query 202, input criteria 344, and output criteria 346. As described, abstract query 202 is composed by using logical fields of DAM 148 to specify query conditions and results fields. Similarly, abstract rules 342 may be composed using logical fields to specify a rule predicate and a rule action. Illustratively, the abstract rule 342 and abstract query 202 may be created in the user interface 115, e.g., a graphical user interface. However, it should be noted that the user interface 115 is only shown by way of example; any suitable requesting entity may create abstract rules 342 and abstract queries 202 (e.g., application 120, an operating system, or an end user).

In one embodiment, abstract query 202 may be translated by runtime component 114 into a resolved query 302. Additionally, resolved query 302 may be composed to retrieve field values required for evaluating input criteria 344. That is, resolved query 302 may retrieve field values beyond those corresponding to abstract query 202 for use in evaluating input criteria 344. Resolved query 302 is submitted to DBMS 116 for execution against database 214, producing query results 312. The query results 312 include field values which can be used as inputs to an abstract rule 342. Frequently, such field values may include a primary entity for which the abstract rule 342 is being executed. For example, for an abstract rule set used to provide patient treatment recommendations, a primary entity may be defined as a patient or test subject. In such situations, the rule predicate (i.e., condition) may be evaluated with field values related to a particular entity (e.g., the results of various medical tests for one patient), and the rule action may apply only to the specific entity (e.g., a treatment recommendation for the one patient). However, it should be noted that the present invention is not limited to the use of field values obtained from query results as inputs to abstract rule 342. Instead, any suitable inputs to abstract rule 342 are broadly contemplated including, for instance, a user inputting data via user interface 115.

In one embodiment, query results 312 may include field values required for evaluating input criteria 344. Input criteria 344 may specify requirements specified for the query results 312 as a whole. Input criteria 344 may be directed to, for example, ensuring statistical validity for an analysis routine. For example, input criteria 344 may specify a minimum record count to establish a valid sampling of a population, or specify required characteristics of members of the population. In another example, assuming each data record of query results 312 represents a person, input criteria 344 may specify an even distribution of gender (i.e., approximately 50% of records for males and 50% for females). As shown, query results 312 and input criteria 344 may be received by input evaluator 170. Generally, input criteria 344 and output criteria 346 may be associated to an abstract rule 342, and may be stored in rule set container 340. Optionally, input criteria 344 and output criteria 346 may be specified by a user interactively at rule execution time, and may be selectively applied to a set of query results.

FIG. 3B illustrates a second stage in processing an abstract rule, according to one embodiment of the invention. In one embodiment, input evaluator 170 may be configured to evaluate the field values included in query results 312 in terms of input criteria 344. As shown, assuming that query results 312 satisfy the input criteria 344, input evaluator 170 signals that the processing of the abstract rule 342 may proceed. Accordingly, the abstract rule 342 is analyzed by the rule translator (i.e., rule analyzer) 160. In one embodiment, rule translator 160 is configured to translate the abstract rule 342 into an executable rule 360. As a result of the translation, executable rule 360 is formatted in the data format required by rule engine 150. One example of such a data format is the Arden syntax, which is used in rule engines for medical knowledge. Further, the predicates included in executable rule 360 (and abstract query 202) may be resolved to query fragments executable by DBMS 116 (e.g., an SQL query fragment). That is, instead of the logical fields referenced by the abstract rule set 342, the executable rule 360 references data structures in the underlying physical database 214.

FIG. 3C illustrates a third stage in processing an abstract rule, according to one embodiment of the invention. As shown in FIG. 3B, rule engine 150 processes executable rule 360, utilizing query results 312 as rule inputs. The rule engine 150 then produces a rule output 380. In one embodiment, rule output 380 may be passed to output evaluator 180, where it is evaluated in terms of output criteria 346. If it is determined that rule output 380 satisfies output criteria 346, rule output 380 may be passed to application 120, and may be used to implement an analysis routine. That is, rule output 380 may be used to fire or execute actions defined in the rules, or to convey messages or recommendations to users. For example, for a set of abstract rules configured to provide treatment recommendations for doctors in medical institutions, rule output 380 may include possible diagnoses and evaluations of patient conditions that may be presented to doctors who are using application 120. Optionally, even if output criteria 346 are not satisfied, rule output 380 may be returned to application 120 with an error or warning message to the user.

Of course, the above examples are provided for illustrative purposes only, and are not intended to limit the scope of the invention. It should also be noted that the components of the relational view 300 are illustratively shown as separate software components. However, embodiments are contemplated in which functionality of any component may be incorporated in other component(s).

FIG. 4 is a flow diagram illustrating a method 400 for processing an abstract rule, according to one embodiment of the invention. Persons skilled in the art will understand that, even though the method is described in conjunction with the systems of FIGS. 1-3, any system configured to perform the steps of method 400, in any order, is within the scope of the present invention.

The method 400 begins at step 410, by receiving an abstract rule and an abstract query for processing in a rule engine. The abstract rule and abstract query may be included in a rule set container. For example, referring to FIG. 3A, application 120 may receive abstract query 202 and abstract rule 342, both of which may be stored in rule set container 340. Abstract query 202 and abstract rule 342 may be composed, for example, by a user interacting with user interface 115.

At step 420, the abstract query may be translated into a resolved query. More specifically, references to logical fields included in the abstract query are replaced with references to physical fields of an underlying database. For example, abstract query 202 may be translated by runtime component 114 into resolved query 302. In one embodiment, the resolved query may also be configured to retrieve field values required for evaluating limiting criteria specified in rule set container 340. For example, resolved query 302 may be configured by runtime component 114 to retrieve data fields required for evaluating input criteria 344 and output criteria 346. Such required data may include, for example, logical fields of DAM 148, saved database queries, database tables, web service calls, and the like. At step 430, the resolved query may be executed to retrieve query results, as well as additional data required to fields for evaluating any input criteria.

At step 440, it is determined whether the query results satisfy the input criteria. Input criteria may specify requirements of the query results, such as a minimum number of records, or a required statistical property. For example, step 440 may be performed by input evaluator 170, which may evaluate query results 312 in terms of input criteria 344. If the input criteria are not satisfied at step 440, then at step 475 an error message may be output, and method 400 may terminate. However, if the input criteria are satisfied at step 440, then at step 450, the abstract rule may be translated into an executable rule. For example, rule translator 160 may translate abstract rule 342 to executable rule 360. At step 460, the executable rule may be processed in a rule engine. For example, executable rule 360 may be executed by rule engine 150 using the input values of the query results 312, as shown in FIG. 3B.

At step 470, it is determined whether the results of the rule engine satisfy the output criteria. Output criteria may specify requirements of the rule results, such as a required statistical property. For example, step 470 may be performed by output evaluator 180, which may evaluate rule output 380 in terms of output criteria 346. If the output criteria are not satisfied at step 470, then at step 475 an error message may be output, and method 400 may terminate. However, if the output criteria are satisfied at step 470, then at step 480, the rule results may be output. For example, rule output 380 may be returned to application 120, as shown in FIG. 3C. After step 480, the method 400 terminates.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
receiving an abstract rule having (i) a conditional statement and (ii) a consequential statement defining a particular result returned by the abstract rule based on an evaluation of the conditional statement and input data supplied to the abstract rule;
receiving a set of query results comprising a plurality of data records, each including a set of input data to be supplied to the abstract rule;
prior to processing the abstract rule against each of the sets of input data included in the plurality of data records, determining whether the sets of input data satisfy input criteria associated with the abstract rule, wherein the input criteria specify one or more requirements to constitute statistical validity of input data supplied to the abstract rule;
upon determining that the input criteria associated with the abstract rule are satisfied, processing the abstract rule against each of the sets of input data and setting, as an output of the abstract rule, a result returned by the abstract rule for each of the sets of input data; and
storing the output of the abstract rule.

2. The computer-implemented method of claim 1, wherein the conditional statement is composed from one or more logical fields, and wherein the logical fields are defined in a data abstraction model modeling an underlying physical database.

3. The computer-implemented method of claim 1, further comprising:
subsequent to processing the abstract rule against each of the sets of input data, determining whether the output of the abstract rule satisfies output criteria associated with the abstract rule, wherein the output criteria specify one or more requirements for output data associated with the abstract rule; and
upon determining that the output criteria associated with the abstract rule are satisfied, returning the output of the abstract rule to a requesting user.

4. The computer-implemented method of claim 1, wherein processing the abstract rule against each of the sets of input data comprises executing a rule engine, and wherein the computer-implemented method further comprises, prior to executing the rule engine, transforming the abstract rule into a form executable by the rule engine.

5. The computer-implemented method of claim 4, wherein transforming the abstract rule comprises:
retrieving a specification of the abstract rule in a first computer-readable language; and
transforming the specification into a language acceptable by the rule engine.

6. The computer-implemented method of claim 1, further comprising, prior to receiving the set of query results, executing an abstract query against a database to determine the set of query results.

7. A non-transitory computer readable medium comprising a program that, when executed, performs an operation comprising:
receiving an abstract rule having (i) a conditional statement and (ii) a consequential statement defining a particular result returned by the abstract rule based on an evaluation of the conditional statement and input data supplied to the abstract rule;
receiving a set of query results comprising a plurality of data records, each including a set of input data to be supplied to the abstract rule;
prior to processing the abstract rule against each of the sets of input data included in the plurality of data records, determining whether the sets of input data satisfy input criteria associated with the abstract rule, wherein the input criteria specify one or more requirements to constitute statistical validity of input data supplied to the abstract rule;
upon determining that the input criteria associated with the abstract rule are satisfied, processing the abstract rule against each of the sets of input data and setting, as an output of the abstract rule, a result returned by the abstract rule for each of the sets of input data; and
storing the output of the abstract rule.

8. The non-transitory computer readable medium of claim 7, wherein the conditional statement is composed from one or more logical fields, and wherein the logical fields are defined in a data abstraction model modeling an underlying physical database.

9. The non-transitory computer readable medium of claim 7, wherein the operation further comprises:
subsequent to processing the abstract rule against each of the sets of input data, determining whether the output of the abstract rule satisfies output criteria associated with the abstract rule, wherein the output criteria specify one or more requirements for output data associated with the abstract rule; and
upon determining that the output criteria associated with the abstract rule are satisfied, returning the output of the abstract rule to a requesting user.

10. The non-transitory computer readable medium of claim 7, wherein processing the abstract rule against each of the sets of input data comprises executing a rule engine, and wherein the operation further comprises, prior to executing the rule engine, transforming the abstract rule into a form executable by the rule engine.

11. The non-transitory computer readable medium of claim 10, wherein transforming the abstract rule comprises:
retrieving a specification of the abstract rule in a first computer-readable language; and
transforming the specification into a language acceptable by the rule engine.

12. The non-transitory computer readable medium of claim 7, wherein the operation further comprises, prior to receiving the set of query results, executing an abstract query against a database to determine the set of query results.

13. A system comprising:
a processor; and
a memory comprising a program that, when executed on the processor, is configured to perform the steps of:
receiving an abstract rule having (i) a conditional statement and (ii) a consequential statement defining a particular result returned by the abstract rule based on an evaluation of the conditional statement and input data supplied to the abstract rule;
receiving a set of query results comprising a plurality of data records, each including a set of input data to be supplied to the abstract rule;
prior to processing the abstract rule against each of the sets of input data included in the plurality of data records, determining whether the sets of input data satisfy input criteria associated with the abstract rule, wherein the input criteria specify one or more requirements to constitute statistical validity of input data supplied to the abstract rule;
upon determining that the input criteria associated with the abstract rule are satisfied, processing the abstract rule against each of the sets of input data and setting, as an output of the abstract rule, a result returned by the abstract rule for each of the sets of input data; and
storing the output of the abstract rule.

14. The system of claim 13, wherein the conditional statement is composed from one or more logical fields, and wherein the logical fields are defined in a data abstraction model modeling an underlying physical database.

15. The system of claim 13, further comprising:
subsequent to processing the abstract rule against each of the sets of input data, determining whether the output of the abstract rule satisfies output criteria associated with the abstract rule, wherein the output criteria specify one or more requirements for output data associated with the abstract rule; and
upon determining that the output criteria associated with the abstract rule are satisfied, returning the output of the abstract rule to a requesting user.

16. The system of claim 13, wherein processing the abstract rule against each of the sets of input data comprises executing a rule engine, and wherein the program performs the further step of transforming the abstract rule into a form executable by the rule engine prior to executing the rule engine.

17. The system of claim 16, wherein transforming the abstract rule comprises:
retrieving a specification of the abstract rule in a first computer-readable language; and
transforming the specification into a language acceptable by the rule engine.

18. The system of claim 13, further comprising, prior to receiving the set of query results, executing an abstract query against a database to determine the set of query results.

19. The computer-implemented method of claim 1, wherein the input criteria specify a minimum record count, wherein the computer-implemented method further comprises:
upon determining that the input criteria associated with the abstract rule are not satisfied, terminating processing of the abstract rule, wherein a first error message is output for display to a requesting user.

20. The computer-implemented method of claim 19, wherein the conditional statement and the consequential statement are defined using a set of logical fields, wherein the logical fields are defined in an abstraction model that models an underlying physical database in a manner making a schema of the underlying physical database transparent to a user of the abstraction model, wherein the computer-implemented method further comprises:
subsequent to processing the abstract rule against each of the sets of input data, determining whether the output of the abstract rule satisfies output criteria associated with the abstract rule, wherein the output criteria specify one or more requirements for output data associated with the abstract rule.

21. The computer-implemented method of claim 20, wherein the output criteria specify required statistical characteristics with respect to the output data associated with the abstract rule, wherein the computer-implemented method further comprises:
upon determining that the output criteria associated with the abstract rule are not satisfied, terminating processing of the abstract rule, wherein a second error message, different from the first error message, is output for display to the requesting user; and
upon determining that the output criteria associated with the abstract rule are satisfied, returning the output of the abstract rule to the requesting user.

22. The computer-implemented method of claim 21, wherein each logical field corresponds to at least one physical field, wherein at least a first logical field has a logical field name that is different from a physical field name of a first physical field corresponding to the first logical field, wherein processing the abstract rule against each of the sets of input data comprises executing a rule engine, wherein the computer-implemented method further comprises:
prior to executing the rule engine, transforming the abstract rule into a form executable by the rule engine; and
prior to receiving the set of query results, executing an abstract query against a database to determine the set of query results.

23. The computer-implemented method of claim 22, wherein transforming the abstract rule comprises:
retrieving a specification of the abstract rule in a first computer-readable language; and
transforming the specification into a second computer-readable language that is acceptable by the rule engine;
wherein the abstract rule is processed by a plurality of operatively connected application components including a rule set container component, a rule translator component, an input evaluator component, a rule engine component comprising the rule engine, and an output evaluator component, wherein the plurality of application components is operatively connected to a database management system (DBMS) managing the physical database.

24. The computer-implemented method of claim 23, wherein the rule set container component permits multiple abstract rule sets, directed to different areas of expertise, to be processed together with a single set of data inputs, while permitting each abstract rule set to be separately maintained by a different rule set owner;
wherein the rule translator component translates abstract rules to executable rules, including transforming the specification from the first computer-readable language into the second computer-readable language;
wherein the input evaluator component evaluates input data to the rule engine component, in order to determine whether the input criteria are satisfied;
wherein the rule engine component performs predefined analysis routines by processing rule sets, wherein the rule sets include the abstract rule, wherein the rule engine component is licensed on a per-use basis, wherein the rule engine component is licensed based on: (i) a total count of users accessing the rule engine component; and (ii) a total count of processors accessing the rule engine component;
wherein the output evaluator component evaluates output data of the rule engine component, in order to determine whether the output criteria are satisfied.

\* \* \* \* \*